United States Patent [19]

Hirakawa et al.

[11] 4,314,868

[45] Feb. 9, 1982

[54] METHOD AND APPARATUS FOR PREVENTING WARP IN CORRUGATED CARDBOARD

[75] Inventors: Tadeshi Hirakawa; Tochiaki Kusubayashi; Yukio Oku, all of Mihara, Japan

[73] Assignee: Mitsubishi Jukogyo Kabushiki Kaisha, Japan

[21] Appl. No.: 64,830

[22] Filed: Aug. 8, 1979

[30] Foreign Application Priority Data

Aug. 10, 1978 [JP] Japan ................................ 53/97712

[51] Int. Cl.³ ............................ B31F 1/20; B32B 3/28

[52] U.S. Cl. .................................... 156/207; 156/210; 156/250; 156/356; 156/462; 428/186; 428/913

[58] Field of Search ............... 428/182, 184, 186, 913; 156/205, 210, 250, 462, 470, 476, 207, 356; 52/291

[56] References Cited

U.S. PATENT DOCUMENTS

| | | | |
|---|---|---|---|
| 2,987,105 | 6/1961 | Gebbie | 156/210 |
| 3,654,032 | 4/1972 | Kruglinski et al. | 156/205 |
| 3,981,758 | 9/1976 | Thayer et al. | 156/470 |
| 4,134,781 | 1/1979 | Carstens et al. | 156/210 |

*Primary Examiner*—Paul J. Thibodeau

*Attorney, Agent, or Firm*—Bernard, Rothwell & Brown

[57] ABSTRACT

A method and apparatus for minimizing or eliminating warp in corrugated board by imparting different curvature on alternate successive lengths of the board being manufactured prior to its being stacked. The corrugated board, as it moves through the manufacturing apparatus, is subjected to treatment on its upper surfaces at different intervals that the lower surfaces to impart various curvatures to the sections being cut and stacked. As the cut corrugated board sections are accumulated in the stack alternate groups of board sections have opposite curvature throughout the height of the stack. The stacked sections are maintained in this disposition a time sufficient for the weight of the stack to render the formed sheets substantially flat.

9 Claims, 13 Drawing Figures

METHOD AND APPARATUS FOR PREVENTING WARP IN CORRUGATED CARDBOARD

BACKGROUND AND DISCUSSION OF THE INVENTION

In the manufacture of corrugated board sheets, there has been a persistent problem of producing these sheets without warpage. Although there have been several attempts to solve this problem none have done so satisfactorily in either reducing and preventing the warpage or, where the board can be flattened, in a manner which is economically acceptable.

An explanation of the types of warp or curvature in the corrugated board as well as some of the devices which have characterized previous attempts to overcome this problem will be described in connection with FIGS. 1 through 5. This should enhance an understanding of the invention described herein and yield an appreciation of the deficiencies in the prior art.

In referring to FIGS. 1 and 2 there are shown the types of undesirable curvature which are often imparted to corrugated board during the manufacture process. In FIG. 1, for example, curves are produced transverse to the path of movement of the board through the corrugating machinery as indicated by the arrows. These curves, when viewed from the top as shown in FIG. 1, can be concave as in 1(*a*), convex as in 1(*b*) or a combination of the two, producing an S-curve as shown in 1(*c*). Curvature can be produced in the direction of movement of the board which is concave as shown in 2(*a*), convex as shown in 2(*b*).

The warp or curvature produced in the direction of movement of the board through the machine, such as that shown in FIG. 2, is often attributable to the tension or stress placed on the board as it moves through the rollers comprising the machine. This type of curvature is primarily eliminated through adjustment of the rollers and mechanisms within the machine to compensate for the undesirable stress or tension otherwise produced.

On the other hand, the curvature transverse to the direction of movement of the board through the machine is primarily caused by an unbalance in the moisture content in the various parts of the board. For example, in connection with FIG. 3, it can be seen that a liner 4 is drawn or pulled through double facer 2 to interface with a single faced board 3 being fed through the same system. The various components of the double facer 2 press and heat the single faced board 3 and the liner 4 previously treated with glue to secure these elements together and form the composite corrugated board in a known manner. Where there is an imbalance in the moisture content of the single faced board 3 compared with the liner 4 warpage in a direction transverse to the direction of movement of the board can occur. For example, the concave curvature of FIG. 1(*a*) occurs when the amount of moisture of the liner of single faced board 3 is greater than that in the liner of the lower sheet 4 shortly before the single faced board 3 and the liner 4 are glued together in the double facer 2. After the gluing step the moisture content of both liners are balanced by drying. Because of the initial moisture imbalance, one side may dry more quickly than the other and, with the accompanying unequal shrinkage, a curve is obtained. Conversely, where the moisture in the liner 4 is greater than that of the single faced board 3 before they are glued together, the convex curve will occur as shown in FIG. 1(*b*). The S-curvature of 1(*c*) results from a combining of the relative moisture contents between the single faced board 3 and the liner 4 where one side of board liner 4 has a greater moisture content than single faced board 3 and the other side the liner 4 has a lower moisture content than single faced board 3. In any event, it has not been possible to control the warp in the direction transverse to the movement of the corrugated board in a satisfactory manner.

An example of previous attempts to solve the warpage problem is shown in FIG. 4. There it can be seen that the corrugated board sheets 1 formed in double facer 2, shown in a larger view in FIG. 4, are piled by a stacker 5. Because of the difficulty in accurately determining the moisture content of liners during continuous operation at a high speed within the corrugating machine, an operator checks the condition of warp sheets 6 which are piled up by the stacker 5. When warpage is detected, this is corrected through the operation of control panel 7. Specifically, to obtain an acceptably flat sheet, the operator controls the moisture content of the corrugated board accumulated in a stack by the stacker by regulating shower portions 8*a* and 8*b* of the single facer, and warp angle adjustment for the preheater rolls, 9*a*, 9*b*, 9*c*, 9*d*, and 9*e*, and through the handling of control ballast roll 11 of double facer 2, as well as the showers 10*a*, 10*b*, and 10*c* of the input portion of the double facer 2. This type of apparatus requires significant discretion on the operator and consequently, requires a high degree of skill. Furthermore, even if the sheets in the stacker were delivered and piled flatly, warpage would still occur because the corrugated sheets often had an imbalance of moisture.

Another attempt to correct warpage is to restack the warped sheets in an alternating manner as shown in batch 12 of FIG. 5. To accomplish this, after the sheets have been cut and stacked automatically in the normal manner from the manufacturing machine, an operator is made available to rearrange the pile such that alternate sheets are overturned. In this manner each sheet has a warp or curve in a direction substantially opposite to the sheets on either side of it. Because of this alternating disposition of sheets the dead weight of the stack will tend to correct the warp. This alternate stacking operation requires a great deal of manpower not only to correct warpage but also to restack the sheets in preparation for printing or box making operations in subsequent processing. Thus, although this approach may satisfactorily achieve a flat disposition prior to further processing, it has been uneconomical, due to the exceptional manpower demands, in correcting the warpage in the corrugated board manufacturing.

The invention described herein overcomes many of the problems described above by achieving a flat disposition for the sheets cut and ejected from the manufacturing machinery in an efficient and economical manner; particularly, the manpower restraints which have characterized some attempts in solving this problem are substantially overcome. In summary, this is accomplished by actually imparting differing warps at certain intervals on the sheets in a specified manner so that, as they are stacked after being cut, the dead weight of the sheets in the stack will eliminate the warpage in a satisfactory manner. This approach avoids the high degree of accuracy and skill required by an operator attempting to balance moisture applied to upper and lower liners. Because the warp is varied in a particular manner prior to the sheets being stacked, there is no need for operator rearranging the sheets after they have been stacked in preparation for further printing or other operations. Rather, the sheets as delivered are in the proper disposition for overcoming and correcting the warp as well as further printing and processing.

More specifically, the warp imparted to the sheets during the manufacturing process is accomplished, in one form of the invention, by spraying the upper liners and lower liners in an alternate fashion. For example, at given intervals the upper liner is sprayed while the lower liner is untreated; after that interval has passed the system is reversed whereby the lower liner is sprayed while the upper liner remains untreated. In this way the corrugated board is warped in different directions during each interval of spray. The board is subsequently cut and automatically stacked. As a result of the alternating spray system, the stacked corrugated boards will correspondingly alternate in warp throughout the height of the stack. The dead weight of the stack will cause these alternating warps to flatten and produce ultimately an acceptably flat sheet.

As will be explained further in the detailed description of the preferred embodiment, a control system is integrated with the fabricating machinery to automatically sense a length of run of the board as it passes through the machine and to activate and deactivate upper and lower spray apparatus for alternating the spray as described above. A preselected interval is obtained by relating the interval of spray to the length of board passing through properly placed sensing apparatus.

The amount of spray directed to either the upper or lower liners over a given interval can be adjusted to control the moisture content for the board. A selection mechanism is provided where the automatic controller can activate, of the series of spray nozzles on a given side of the board, only those selected while leaving the unselected spray nozzles unactivated throughout the entire process. This prevents those portions of the liner where spraying is not required from being sprayed under the automatic control system. Thus, the operator, when dealing with the board as it comes off the fabricating machine, can regulate the amount of moisture being imparted to the board through selection and adjusting mechanisms provided in the automatic controller.

These features which overcome many of the problems confronted by the prior art as well as other features of the invention will be better appreciated in the description of the preferred embodiment which follows hereinafter.

A BRIEF DESCRIPTION OF THE DRAWINGS

DETAILED DESCRIPTION OF PREFERRED EMBODIMENTS

Figure 1A:
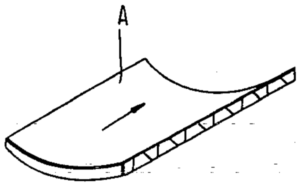
FIG. 1 is a perspective view of sections of corrugated board showing various warp configurations transverse to the direction of movement of the board through the fabricating machine.
Figure 1B:
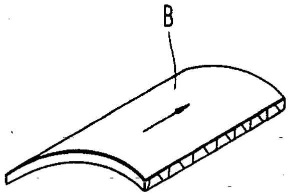
Figure 1C:
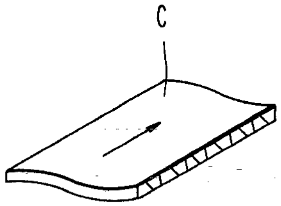
Figure 2A:
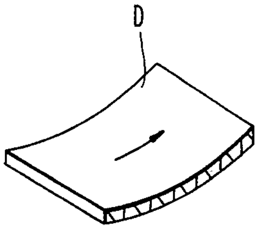
FIG. 2 is a perspective view of various portions of corrugated board showing warp configurations in the direction of movement of the board through the fabricating machine.
Figure 2B:
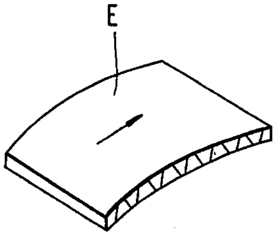
Figure 3:
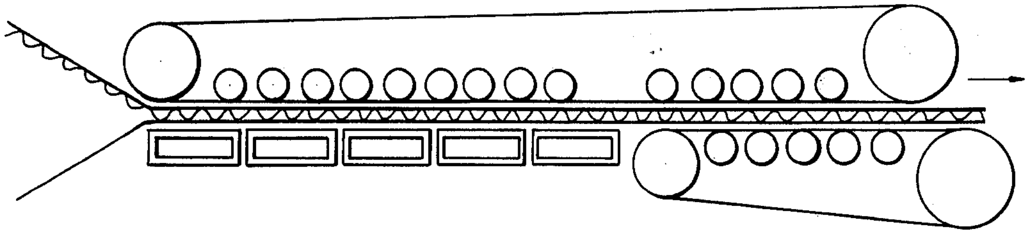
FIG. 3 is a schematic of a portion of a corrugated board fabricating machine where a liner is secured to a single faced board.
Figure 4:
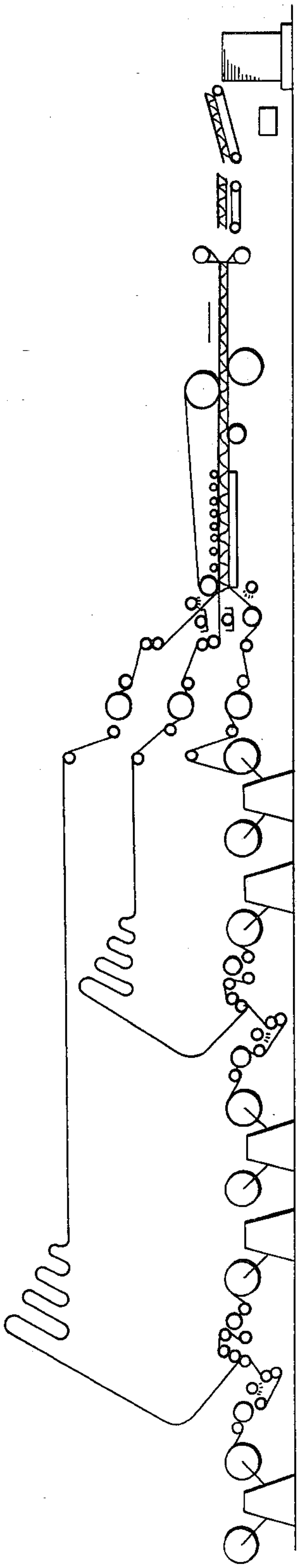
FIG. 4 is a schematic of a warp control system for production of corrugated board which is example of prior art systems.
Figure 5:
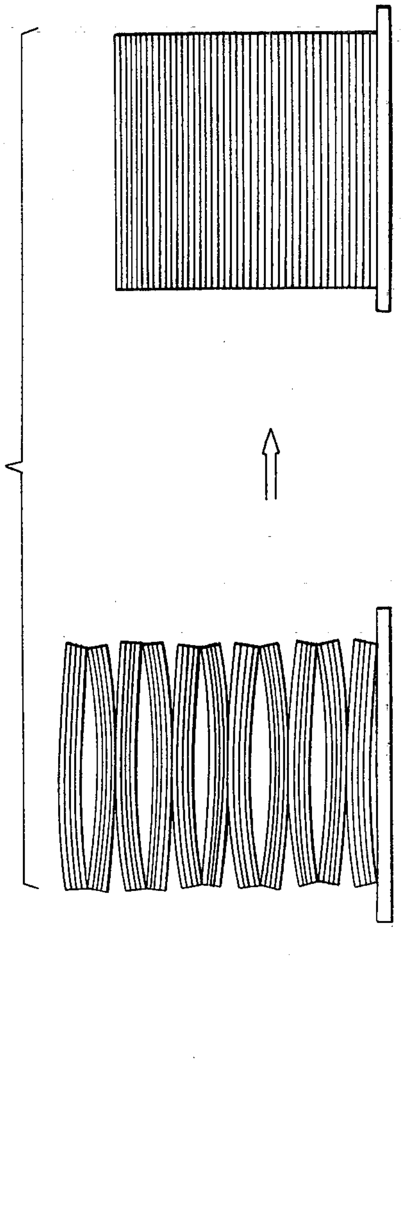
FIG. 5 is a schematic of warp sheets being stacked in an alternate fashion in a prior art system.
Figure 6:
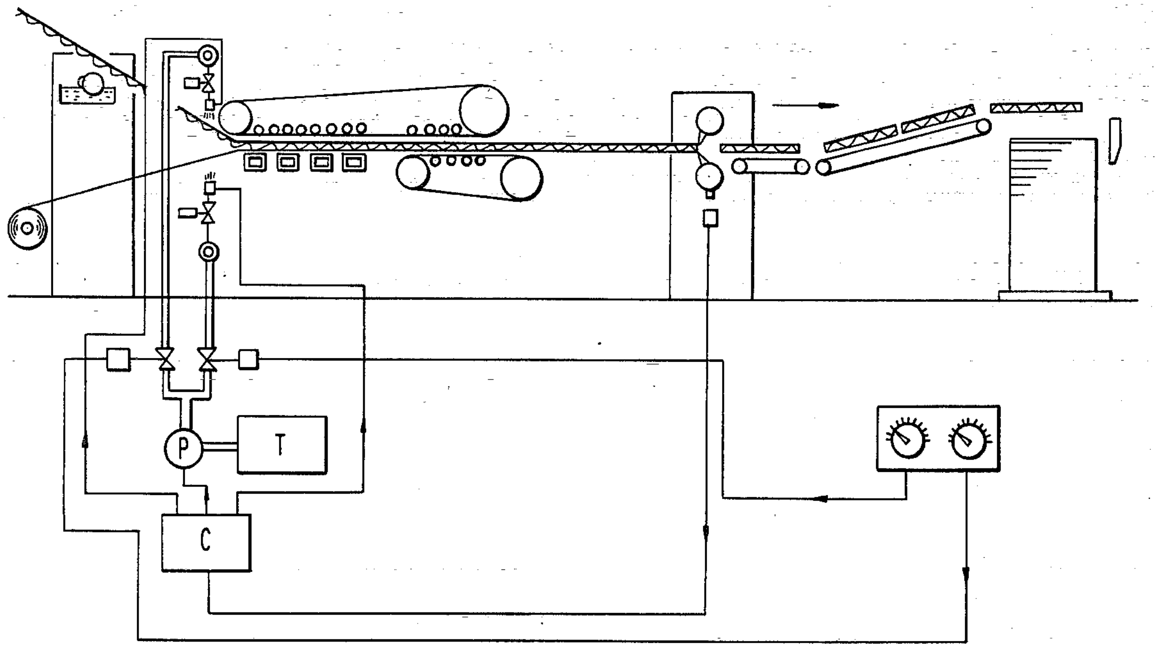
FIG. 6 is a schematic of a portion of a corrugating machine incorporating the spray system and automatic control system of the invention described herein.

A preferred embodiment incorporating the features of the invention is shown in FIG. 6. It can be seen in this figure that a single faced board 13 already having a corrugated portion 13*a* secured to an upper liner 13*b* is fed toward an inlet end of a double facer 15 with a lower liner 16 being fed to the same double facer 15 where the single faced board 13 and liner 16 are joined to form the corrugated board 17 in a well known fashion. Prior to this joining the single faced board 13 is passed through a glue machine 14 where at least the tips of the corrugated portion 13*a* forming part of a single faced board 13 are coated with glue. As sheet or liner 16 and single faced board 13 pass through the corrugated 15 the lower sheet or liner 16 is secured to the tips of the corrugated sheet in a known fashion to form the corrugated board 17. Subsequently, corrugated board 17 is cut into preselected lengths at cut off 18 located downstream of the discharge end of double facer 15. The cut sections are piled by stacker 19 into stack 43. As the stacking mechanisms are well known in the art they will not be described in detail herein.

Figure 7:
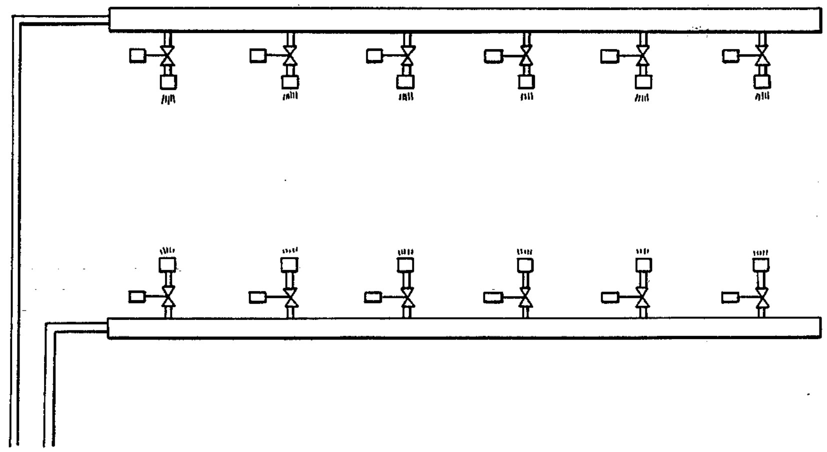
FIG. 7 is a schematic of the valves and spray nozzles arranged transversely across the path of movement for the corrugated board as shown in FIG. 6.

A system for spraying water onto the upper liner 13*b* and lower liner 16 is integrated into the machinery, in this particular embodiment, prior to single faced board 13 and liner 16 being secured together. The apparatus for this water spray system includes a series of spray nozzles 20*a* through 20*f*, as shown in FIG. 7, arranged transversely across the path of movement of single faced board 13 between glue machine 14 and double facer 15. Similarly, a second series of spray nozzles 21*a* through 21*f* are arranged transversely across the path of movement of lower liner 16 also between glue machine 14 and the inlet of double facer 15. The nozzles 20*a* through 20*f* and 21*a* through 21*f* are connected to corresponding piping 22 and 23 respectively through electromagnetically operated valves 24*a* to 24*f* for the upper series of nozzles 20 and 25*a* through 25*f* for the lower series of nozzles 21. Each valve is operated electromagnetically independently of the other valves.

When the spray nozzles are located as described above water or moisture laden air is delivered to the nozzles for spraying the upper and lower liners 13*b* and 16 respectively. For this purpose pump 28 is connected to pipes 22, 23 through pipes 26 and 27, respectively, to pump water or other fluids to the nozzles 20 and 21 from storage tank 29. Downstream of pump 28, in pipes 26 and 27, there are located electromagnetic pressure control valves 30 and 31 for regulating the pressure and ultimately the flow of fluid through pipes 26 and 27. By controlling the pressure within the pipes 22 and 23 the pressure and the amount of spray from the spray nozzles 20 and 21 is also controlled. These electromagnetic pressure controlled valves 30, 31 are connected to their respective variable controllers 44 and 45 on controller 42 as shown in FIG. 6 such that the operator can control the amount of spray emanating from the nozzles 20, 21 at a position remote from the nozzle location.

The control system includes a method for selecting the number of nozzles 20, 21 which can be used during the spray process as well as the interval for alternate activation and deactivation of a set of nozzles 20, 21 so selected. In this embodiment, during a first interval of time lower set of nozzles 21 are deactivated while the upper set of nozzles are activated to spray liner 13*b*. After this interval has passed the control system then deactivates the upper set of nozzles 20 and activates the lower set of nozzles 21 to spray in turn lower liner 16 for a second interval of time of the same length as the first interval. For successive intervals of time the control system activates and deactivates upper and lower nozzles in the manner described.

Figure 8:
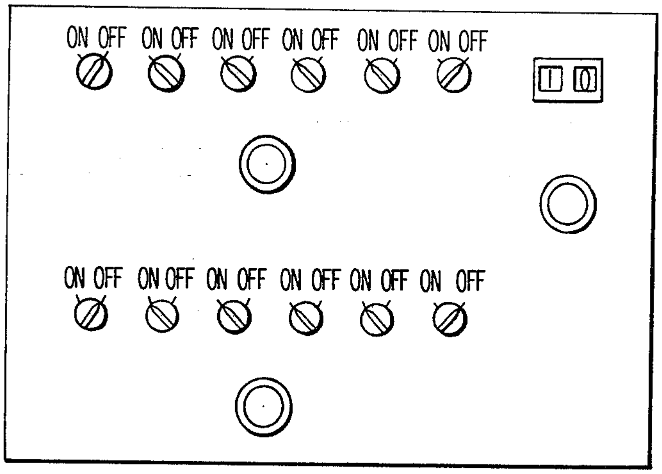
FIG. 8 is a front view of the controller for operating the valves and spray nozzles illustrated in FIG. 7.

A control system is integrated with the cut off 18 through a controller 32 for enabling the operator to select the intervals for alternate spray actuation as well as other aspects of the operation of nozzles 20, 21. The controller 32, shown in more detail in FIG. 8, is connected by an electric circuit to cylinder 33 for cutting the board through a sensor 35. At each revolution of cylinder 33, the sensor 35 sends a cut signal to the controller 32. A selector 38 enables the operator to choose the number of cuts that will be made during each of the aforementioned intervals of time. The controller 32 is integrated with the electromagnetic valves 24, 25 to operate the spray nozzles 20, 21 alternately in response to a signal corresponding to the selected number of cuts that have been made in cut off 18. This will be explained in more detail in the discussion of operation which follows later.

The control system is arranged such that nozzles to be actuated for spraying the upper liner 13*b* and the lower liner 16 can be selected on controller 32. Each of electromagnetic valves 24*a*–24*f* and 25*a*–25*f* is electrically integrated with controller 32 by switches 36*a*–36*f* and 37*a*–37*f* respectively. In this way the operator can select which spray nozzles he wants activated on and off during the operation of the apparatus. For example, as shown in FIG. 8, switches 36*a* and 36*f* as well as 37*a* and 37*f* are in the off position. As a result these nozzles will never be activated during the operation of the apparatus. Of course, any other combination of valves can be selected as desired depending on the moisture content of the corrugated board being treated as well as the warp desired to be imparted.

A pump switch 39 is provided on the control panel of controller 32 to activate and deactivate the pump 28. Switches 40 and 41 operate to override individual selector switches 36*a* through 36*f* and 37*a* through 37*f* respectively. When the operator desires, for whatever reason, to eliminate an entire series of switches 36, 37, rather than having to turn each individual switch to the off position the entire series can be deactivated by the operation of switch 40 or 41. As explained earlier, controller 42 includes variable control members 44 and 45 to regulate the pressure of fluid being pumped from pump 28 to spray nozzles 20 and 21. Thus where the warp for either the upper liner 13*b* or the lower liner 16 appears to either too great or insufficient, these can be controlled by operation of the controllers 44 and 45. This ability to control excessive warp allows the operator to prevent warpage to a degree which might jam or otherwise interfere with the normal operation of the machine.

In operation, the operator selects the number of sections, typically between 10 and 15, of sheets to be cut and stacked in each group through selector 38 on controller 32. If the operator desires not to use all of nozzles 20*a*–20*f* and 21*a*–21*f*, in spraying upper and lower liners 13*b* and 16, the supply to selected nozzles is cut off by actuating appropriate switches of 36*a*–36*f* and 37*a*–37*f*. For example, as mentioned earlier in this description the end nozzles are cut off by switches 36*a* and 36*f* and 37*a* and 37*f* placed in the off position. This is desirable when the moisture content at the edges of liners 13*b*, 16 is balanced such that warpage will not occur, but moisture content in the center is inadequately balanced. Switches 40 and 41 then are placed in the on position such that other elements of the controller are not overridden and the valves 30, 31 controlling flow from pump 28 to pipes 26 and 27 and ultimately to piping 22 and 23 are opened to allow flow to the selected nozzles 36*b* through 36*e* and 37*b* to 37*e*. If, for example 10 layers are selected by selector 38, electromagnetic valves 24*b* to 24*e* and 25*b* to 25*e* will be alternately turned on and off after each interval, that is the time required to cut ten sections of corrugated board. Specifically, as the first ten sections are cut in the cut off 18, valves 24*b* through 24*e* are opened to spray upper liner 13*b* while valves 25*b* to 25*e* are closed in which case there is no spray being imparted to lower liner 16. After the ten sections have been cut, the controller then operates to deactivate valves 24*b* through 24*e* in which case no spray will then be emanating from nozzles 20*b* through 20*e* while at the same time valves 25*b* through 25*e* will be activated in which case the lower liner 16 will be sprayed for the next interval as 10 sections are cut. The controller then continues to operate in this manner alternating the activation of nozzles 20 and 21 after each group of 10 sections has been cut.

In this way an alternating warp will be imposed on successive groups of sections of board cut and stacked in stack 43. When the number 10 is chosen by selector 38 ten sheets will be initially be warped in one direction and stacked while successive groups of 10 sheets will be warped in the opposite direction due to the alternating effect of the spray. As a result, each successive group of ten sheets being stacked will have a warp substantially opposite to that of the preceding group of ten sheets supplied to the stack.

If the warp is too great or too small, controllers 44 and 45 can be operated to achieve conditions which are more appropriate to the sheets being piled by stacker 19 onto stack 43. Through operation of variable controllers 44 and 45, control is exerted over the quantity of spray expelled from nozzles 20*b* through 20*e* as well as 21*b* through 21*e*. When the operator finds that the warp in either direction is too large, the spray from the upper nozzles 20 or the lower nozzles 21 can be reduced accordingly. Of course, when the opposite effect occurs, warp is insufficient, spray from the lower or upper nozzles can be increased accordingly.

Once the desired warp has been achieved from the alternating spray process imparted to the board as it passes through the corrugated board fabricating machine, as it is described above, the warped board will be stacked in stack 43 with alternating warp as explained. Here, if allowed to rest for a sufficient length of time, the dead weight of the wet board will eventually straighten the warp imparted, resulting in an acceptably flat sheet.

In the apparatus discussed above, the interval for spraying the upper liners is equal to that for the lower liner such that successive groups of 10 sheets or board will be warped in the opposite direction. However, the same acceptable result can be achieved even if these intervals were different. For example, intervals could be chosen whereby groups of 10 sheets would be warped in one direction with groups of 5 sheets being alternately warped in the opposite direction. When these groups are stacked in alternating fashion, and allowed to rest for a sufficient time, the dead weight will then so flatten the sheets to an acceptable configuration.

Figure 9:
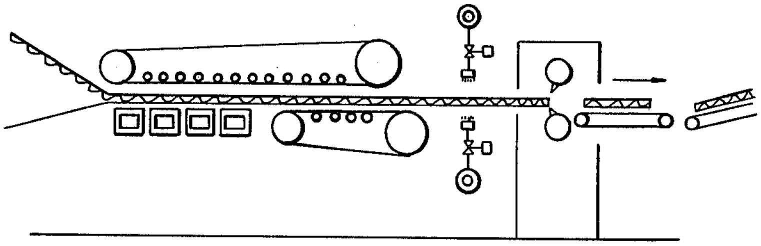
FIG. 9 is a schematic of a portion of corrugating machine which is another embodiment employing features of the invention described herein.

In the embodiment discussed above, in connection with FIGS. 6, 7 and 8, the spray nozzles 20 and 21 are located upstream of the double facer 15. However, it is not necessary that the spray equipment be placed in this particular position. As shown in FIG. 9 the spray nozzles 20 and 21 along with the valves 24 and 25 as well as the other equipment employed for delivery of the water or fluid can be located downstream of the double facer 15. With this configuration, the board 17 is treated after the lower liner 16 has been secured to the upper single faced board 13. Alternating operation effected through controller 32 on spray nozzles 20 and 21 of FIG. 9 will result in the same alternating warp in a manner similar to the system as described with respect to FIGS. 6, 7 and 8.

Figure 10:
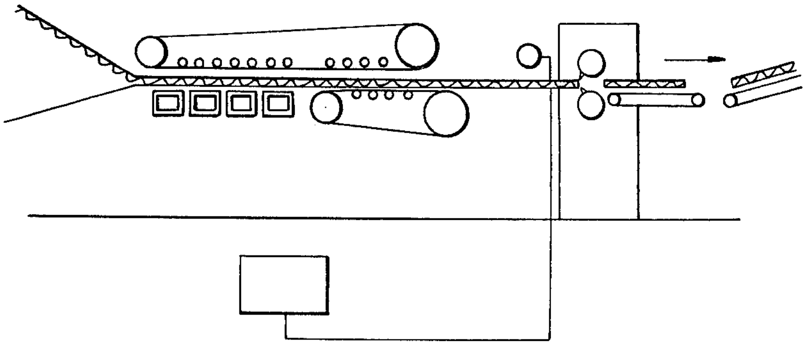
FIG. 10 is a schematic of another embodiment employing features of the invention.
Figure 1A:
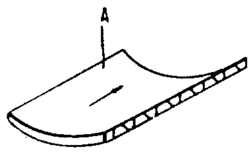
Figure 1B:
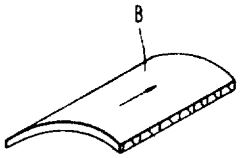
Figure 1C:
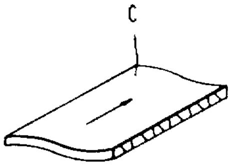
Figure 2A:
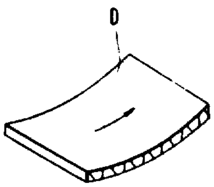
Figure 2B:
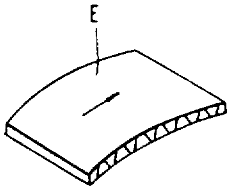
Figure 3:
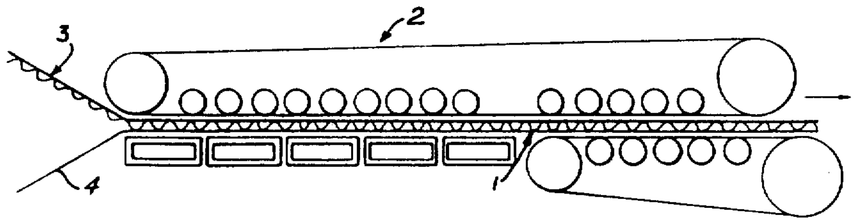
Figure 4:
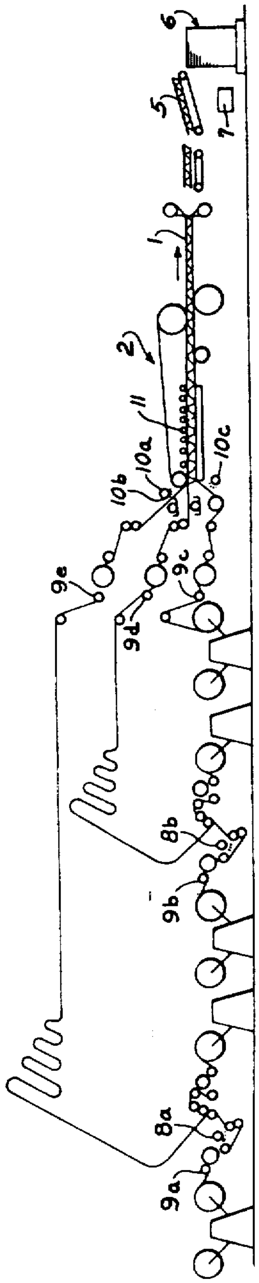
Figure 5:
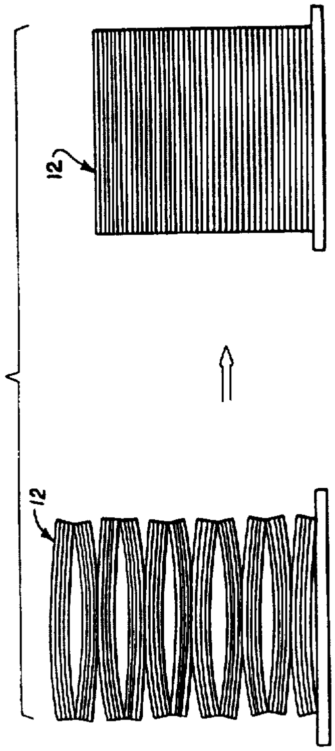
Figure 6:
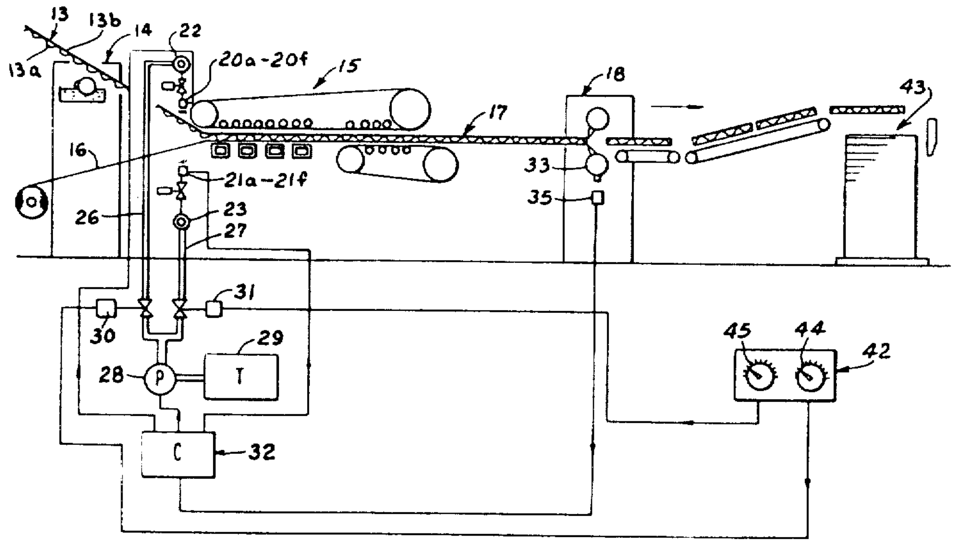
Figure 7:
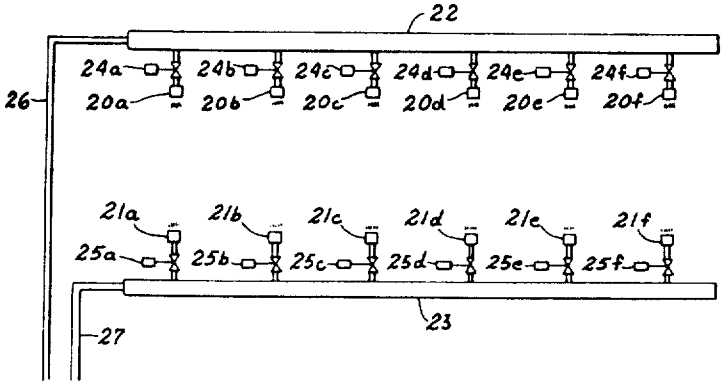
Figure 8:
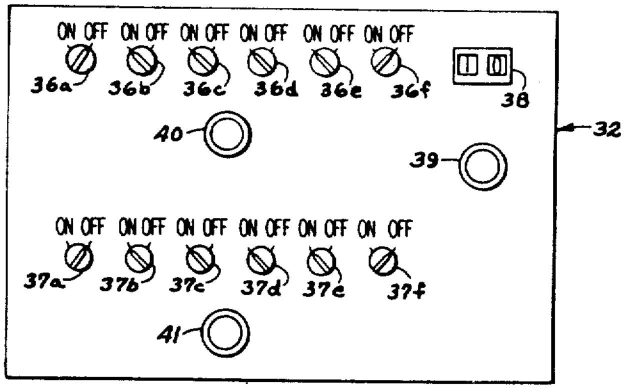
Figure 9:
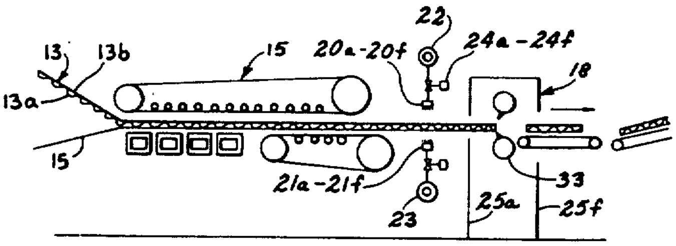
Figure 10:
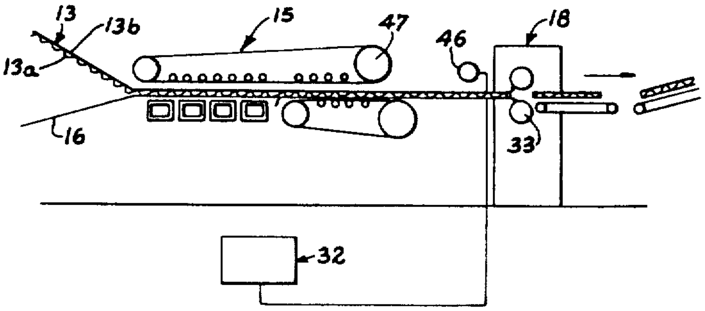

Another embodiment which includes features of the invention is shown in FIG. 10. In lieu of the cutting box 18 and cutter 33 as a means for measuring the length of board being cut and ultimately the intervals through which the spray nozzles will be operated, a measuring wheel 46 is used to measure the desired length through which the board should be sprayed on one side or the other. The wheel 46 is electrically connected to controller 32 in a manner similar to connection for sensor 35 of the embodiment shown in FIG. 6; however, the signal will relate to the constantly running wheel 46 rather than the cutting action of cutter 33. In addition, the running length of the corrugated board may be measured through the numbers of revolutions of rollers 47 or some other suitable roller instead the separate wheel 46 as shown in FIG. 10.

Because of the warp imposed on the sections cut during predetermined intervals as described in the embodiment above, it is not necessary to go through the effort as explained before for turning the sheets for correcting the warp. Rather this is accomplished automatically and results in great savings in utilizing corrugated board fabricating machine in printing and packing which takes place following the production of the corrugated board. In addition this enables the elimination of such warpage with little loss in time. As a result, operation of the system enhanced by reducing manpower and maintaining flat board results in an efficient and effective manner.

We claim:

1. A method for treating corrugated board comprising:

(a) moving an upper liner, a lower liner, and an intermediate corrugated sheet toward a cutting zone;

(b) securing said upper liner, said intermediate sheet, and said lower liner, together with said intermediate sheet sandwiched between said upper and lower liners to form a corrugated board prior to movement through said cutting zone;

(c) cutting said corrugated board into sections in said cutting zone;

(d) stacking successive cut sections of corrugated board on preceding cut sections of corrugated board in a stack after said cutting step;

(e) imparting different curvature to said sections prior to said stacking steps; and (f) said imparting step being controlled for imparting curvature on successive sections substantially opposite to curvature on preceding sections to permit the weight of said stack to correct said formed different curvature and render said corrugated board substantially flat.

2. The method according to claim 1 wherein said step for imparting curvature includes:

(a) treating said upper liner to form curvature in said sections of corrugated board at intervals;

(b) treating said lower liner to form curvature in said sections of corrugated board at intervals different from those of said treating step for said upper liner.

3. The method according to claim 2 wherein said treating step includes spraying said liner with water at spaced intervals; and spraying said lower liner at intervals when said upper liner is not being sprayed.

4. The method according to claim 3 wherein said spraying step occurs prior to said cutting step.

5. The method according to claim 3 wherein said spraying step occurs before at least one of said upper liner and said lower liner are secured to said intermediate corrugated sheet to form said corrugated board.

6. The method according to claim 3 wherein said spraying step occurs after said upper liner and said lower liner have been secured to said corrugated sheet to form said corrugated board.

7. The method according to claim 5 or 6 wherein said spraying step includes spraying said upper liner along a preselected length thereof, spraying said lower liner along a preselected length thereof, alternating spray between said upper liner and said lower liner at regular intervals.

8. A method for treating corrugated board comprising:

(a) moving an upper liner, a lower liner, and an intermediate corrugated sheet toward a cutting zone;

(b) securing said upper liner, said intermediate liner and said lower liner together with said intermediate sheet sandwiched between said upper and lower liners to form a corrugated board prior to movement through said cutting zone;

(c) cutting said corrugated board into sections in said cutting zone;

(d) imparting forcibly different curvature to said board on alternate lengths corresponding to prescribed number of said cut sections during movement of said board prior to said cutting step;

(e) stacking in order successive cut sections of corrugated board on preceding cut sections of corrguated board; and (f) said imparting step being controlled for imparting curvature on said board to permit the weight of said stack to correct said formed different curvature and render said cut sections substantially flat.

9. The method according to claim 8 wherein said step for imparting curvature includes:

(a) treating said upper liner by adding moisture to force curvature in said sections of corrugated board at spaced intervals of said length corresponding to said prescribed number of said cut sections; and (b) treating said lower liner by adding moisture to form curvature in said corrugated board at intervals different from those of said treating step for said upper liner.

* * * * *

UNITED STATES PATENT AND TRADEMARK OFFICE

CERTIFICATE OF CORRECTION

PATENT NO. : 4,314,868

DATED : February 9, 1982

INVENTOR(S) : Tadeshi Hirakawa et al.

It is certified that error appears in the above-identified patent and that said Letters Patent is hereby corrected as shown below:

The title page showing the illustrative figure should be deleted to appear as per attached title page.

In the drawings the four (4) sheets of drawings should be deleted to be replaced with four (4) sheets of drawings as shown on the attached sheets.

Signed and Sealed this

*Third* Day of *July 1984*

[SEAL]

*Attest:*

GERALD J. MOSSINGHOFF

*Attesting Officer* *Commissioner of Patents and Trademarks*

United States Patent [19]
Hirakawa et al.

[11] 4,314,868
[45] Feb. 9, 1982

[54] METHOD AND APPARATUS FOR PREVENTING WARP IN CORRUGATED CARDBOARD

[75] Inventors: Tadeshi Hirakawa; Tochiaki Kusubayashi; Yukio Oku, all of Mihara, Japan

[73] Assignee: Mitsubishi Jukogyo Kabushiki Kaisha, Japan

[21] Appl. No.: 64,830

[22] Filed: Aug. 8, 1979

[30] Foreign Application Priority Data

Aug. 10, 1978 [JP] Japan .................................. 53/97712

[51] Int. Cl.³ .............................. B31F 1/20; B32B 3/28
[52] U.S. Cl. ...................................... 156/207; 156/210; 156/250; 156/356; 156/462; 428/186; 428/913
[58] Field of Search ............... 428/182, 184, 186, 913; 156/205, 210, 250, 462, 470, 476, 207, 356; 52/291

[56] References Cited

U.S. PATENT DOCUMENTS

| | | | |
|---|---|---|---|
| 2,987,105 | 6/1961 | Gebbie | 156/210 |
| 3,654,032 | 4/1972 | Kruglinski et al. | 156/205 |
| 3,981,758 | 9/1976 | Thayer et al. | 156/470 |
| 4,134,781 | 1/1979 | Carstens et al. | 156/210 |

*Primary Examiner*—Paul J. Thibodeau
*Attorney, Agent, or Firm*—Bernard, Rothwell & Brown

[57] ABSTRACT

A method and apparatus for minimizing or eliminating warp in corrugated board by imparting different curvature on alternate successive lengths of the board being manufactured prior to its being stacked. The corrugated board, as it moves through the manufacturing apparatus, is subjected to treatment on its upper surfaces at different intervals that the lower surfaces to impart various curvatures to the sections being cut and stacked. As the cut corrugated board sections are accumulated in the stack alternate groups of board sections have opposite curvature throughout the height of the stack. The stacked sections are maintained in this disposition a time sufficient for the weight of the stack to render the formed sheets substantially flat.

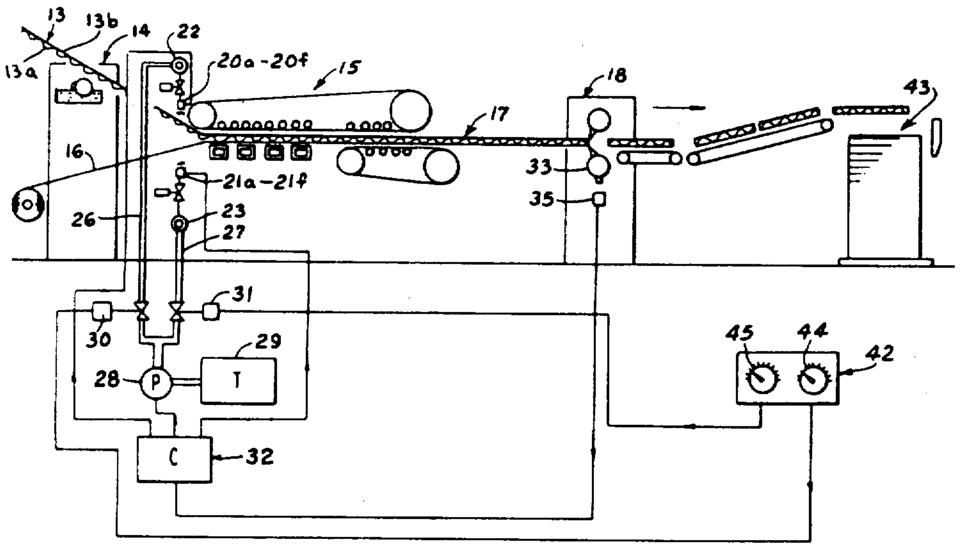

9 Claims, 13 Drawing Figures